United States Patent [19]

Fujiki

[11] 4,117,483
[45] Sep. 26, 1978

[54] NOISE-IMMUNE SIGNAL PROCESSING CIRCUIT FOR PULSED RADARS

[75] Inventor: Norio Fujiki, Yokohama

[73] Assignee: Nissan Motor Company, Limited, Japan

[21] Appl. No.: 740,746

[22] Filed: Nov. 10, 1976

[51] Int. Cl.² .............................................. G01S 9/44
[52] U.S. Cl. ........................................................ 343/8
[58] Field of Search .......................................... 343/8

[56] References Cited

U.S. PATENT DOCUMENTS

| 2,911,641 | 11/1959 | Kohler | 343/8 X |
| 3,761,925 | 9/1973 | Bollard | 343/8 |
| 3,787,854 | 1/1974 | Friedman et al. | 343/8 |

Primary Examiner—T.H. Tubbesing

Attorney, Agent, or Firm—Robert E. Burns; Emmanuel J. Lobato; Bruce L. Adams

[57] ABSTRACT

In a pulsed radar utilizing the phase shift of the intermediate frequency signal of a return echo with the speed of a moving object relative to a given point, a signal processing circuit includes a pair of comparators which respond to the intermediate frequency signal by generating first and second output signals when the input signal reaches positive and negative threshold levels, respectively. The comparator outputs are connected to a bistable device which periodically changes its binary state in response to the phase shift of the intermediate frequency signal. When the bistable device changes its state, the positive and negative threshold levels are varied in a manner to ensure that the bistable device retains its state even though noise is introduced into the intermediate frequency signal.

7 Claims, 3 Drawing Figures

NOISE-IMMUNE SIGNAL PROCESSING CIRCUIT FOR PULSED RADARS

BACKGROUND OF THE INVENTION

The present invention relates generally to pulse radars, and particularly to a pulse radar which utilizes the fact that the coherent phase of an intermediate frequency of a return signal shifts with the speed of an object moving relative to a given point. More particularly, the invention relates to a noise-immune circuit for processing the intermediate frequency signal to determine the relative speed of the moving object.

A prior art processing circuit for pulse radars utilizing the phase shift of the intermediate frequency signal determines the phase shift of the intermediate frequency signal by comparing its amplitude with a set of fixed threshold levels. However, the amplitude of the intermediate frequency signal fluctuates because of the presence of noise and as a result, the processing circuit generates a false output. This is particularly severe when the relative speed of the moving object is low, since the peak value of the intermediate frequency signal tends to dwell on a level near the threshold levels.

SUMMARY OF THE INVENTION

The primary object of the invention is therefore to provide a reliable signal processing circuit for pulse radars which is immune to noise.

Another object of the invention is to provide a signal processing circuit for pulse radars which compares the amplitude of the intermediate frequency signal of the return echo signal with a set of variable threshold levels.

in accordance with the present invention, there is provided a pulse radar having means for transmitting pulsed high-frequency electromagnetic energy to an object moving relative to a given point, an input adapted for receiving a signal returned from the object, means for converting the signal into an intermediate frequency signal which varies in phase with the speed of said object relative to the given point, and a circuit for processing the intermediate frequency signal in order to determine the relative speed, wherein the processing circuit comprises means for generating a first output signal when a positive half wave of the intermediate frequency signal reaches a positive threshold level and generating a second output signal when a negative half wave of the intermediate frequency signal reaches a negative threshold level, a bistable device responsive to the first and second output signals to assume first and second binary states respectively, means for permitting passage to the bistable device of the one of the output signals that occurs earlier than the other output signal and preventing the passage of the outer output signal to the bistable device until the order of occurrence of the output signals is reversed, and means for varying the positive and negative threshold levels when the bistable device changes its binary state.

Specifically, the absolute value of the positive threshold level is smaller than that of the negative threshold level when the bistable device is in one of the first and second binary states to make certain that the first output pulse is generated even when noise is introduced to the received signal, so that, when both positive and negative threshold levels are varied in responsive to the change of state of the bistable device, the absolute value of the negative threshold level becomes smaller than that of the positive threshold level to make certain that the second output pulse is generated even when noise is introduced to the received signal.

BRIEF DESCRIPTION OF THE DRAWINGS

The invention will be further described with reference to the accompanying drawings, in which.

DESCRIPTION OF THE PREFERRED EMBODIMENTS

Figure 1:
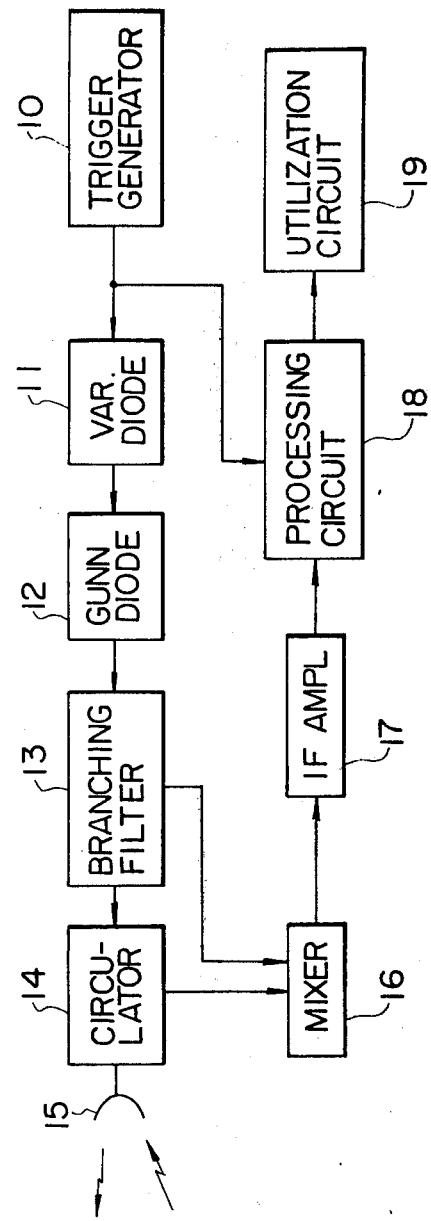
FIG. 1 is a circuit block diagram of a conventional pulse radar including a signal processing circuit.

Before describing the present invention, reference is first had to FIG. 1 which illustrates a conventional pulse radar. In FIG. 1 a trigger generator 10 supplies high-repetition trigger pulses of short duration to a varactor diode 11 which is coupled to a Gunn diode 12 such that the signal generated by the Gunn diode 12 at a carrier frequency $f_o$ in the microwave region is frequency-modulated or frequency-shifted by as much as $\Delta f_o$ as the capacitance of the varactor diode 11 is varied by the trigger signal. The output from the Gunn diode 12 is passed through a branching filter 13 and applied on the one hand to a circulator 14 and thence to an antenna 15 for transmission, and on the other hand to a mixer 16 as a local oscillator frequency. A return echo signal from an object moving relative to a given point is receiver by the antenna 15 and passed through the circulator 14 to the mixer 16. Since the trigger pulse persists only for a short duration of interval, the received signal is mixed with the signal $f_o$. The mixer 16 thus generates an output at an intermediate frequency, which is amplified by an IF amplifier 17 to generate a train of burst signals at the intermediate frequency and passed to a signal processing circuit 18 which also receives triggering pulses from trigger generator 10 to provide an output representative of the relative speed of the target. The speed representative signal from the processing circuit 18 is connected to a utilization circuit 19 for indication of the relative speed.

Figure 2:
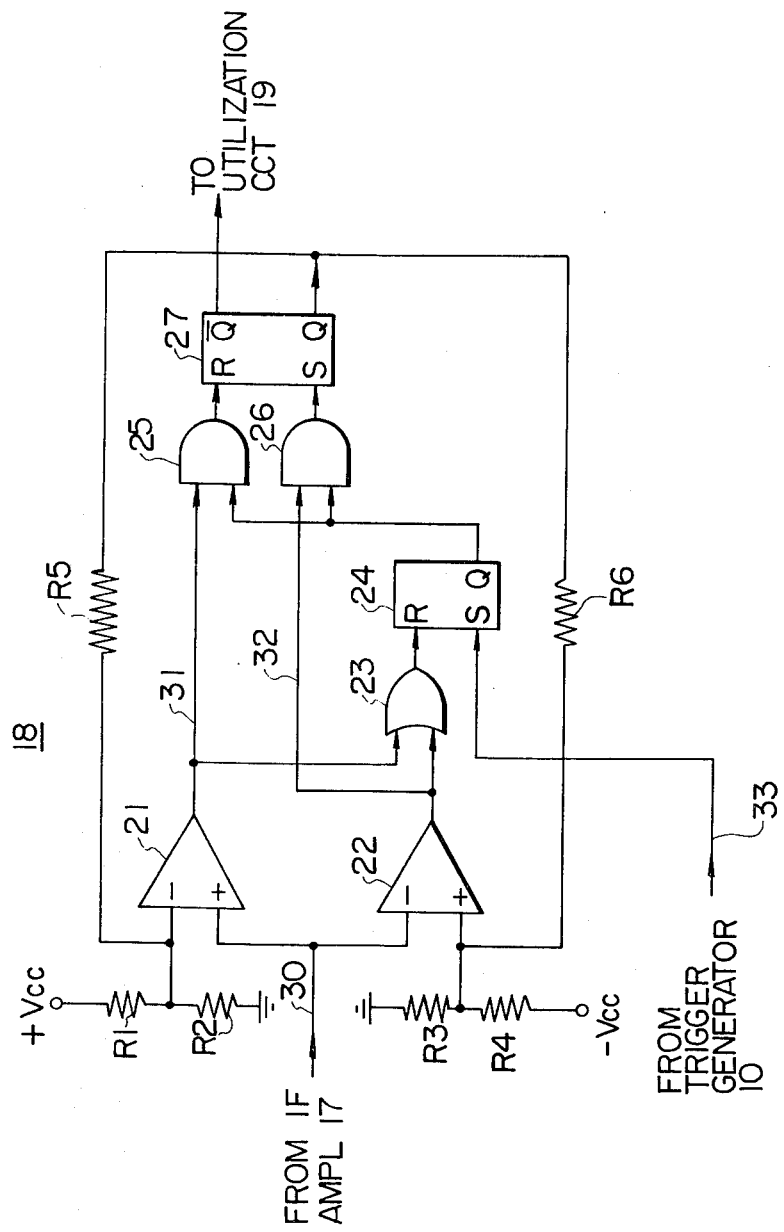
FIG. 2 is a circuit diagram of the signal processing circuit of FIG. 1.

FIG. 2 illustrates a detailed circuit of the signal processing circuit 18 in accordance with the invention. The circuit 18 includes a pair of operational amplifier comparators 21 and 22 each having inverting and noninverting input terminals. The noninverting input terminal of comparator 21 and the inverting input of comparator 22 are coupled together to the output of the IF amplifier 17 through lead 30. The inverting input terminal of comparator 21 is connected to a positive voltage supply $V_{cc}$ through a voltage divider formed by resistors R1 and R2. Similarly, the noninverting input terminal of comparator 22 is connected to a negative voltage supply $V_{cc}$ through voltage divider formed by resistors R3 and R4. The output of the comparator 21 is connected on the one hand through an OR gate 23 to the reset terminal of a flip-flop 24 and on the other hand to an AND gate 25 to which is also connected the Q output of flip-flop 24. The output from the comparator 22 is connected on the one hand through the OR gate 23 to the reset terminal of the flip-flop 24 and on the other hand to an AND gate 26 to which is also connected the Q output of the flip-flop 24. The outputs from AND gates 25 and 26 are connected to the reset and set inputs of a flip-flop 27, respectively. The Q output of the flip-flop 27 is connected through a feedback resistor R5 on the one hand to the inverting input of the comparator 21 and on the other hand through a feedback resistor R6 to the noninverting input of comparator 22. The trigger pulses from the trigger generator 10 is applied to the set input of the flip-flop 24. The complementary output of the flip-flop 27 is coupled to a pulse counter (not shown) in utilization circuit 19.

The operation of the circuit of FIG. 2 will be described with reference to a series of waveforms illustrated in FIG. 3. The output from the IF amplifier 17 is a train or bursts at the intermediate frequency and each burst varies in phase as the target moves with respect to the antenna 14. Specifically, as the target has moved as much as a quarter wavelength of the carrier frequency $f_o$, the IF signal has a phase shift of 180°. FIG. 3a illustrates a series of exemplary IF signal waveforms. The comparator 21 generates an output pulse when the potential at the noninverting input reaches the positive DC reference potential at the inverting input, and the comparator 22 generates an output pulse when the potential at the inverting input reaches the negative DC reference potential at the noninverting input. The DC reference potential for the comparator 21 is set at a value as indicated at 40 well below the maximum positive amplitude of the IF signal to make certain that the positive half wave of the signal will trigger the comparator 21 even when noise is present, while the reference potential for the comparator 22 is set at a value indicated at 41 slightly smaller than the maximum negative amplitude of the IF signal. The trigger signal 33a on lead 33 switches the flip-flop 24 into the set condition producing a high Q output indicated at 34a FIG. 3e). The first IF signal 30a on lead 30 is assumed to have occurred with the first of its half waves being positive and greater in amplitude than the threshold level 40. The comparator 21 thus generates a pulse 31a on lead 31 which activates AND gate 25 to reset flip-flop 27. The pulse 31a from comparator 21 is also passed through OR gate 23 to reset flip-flop 24, thereby deactivating AND gate 25. It is to be noted that since the AND gate 25 is activated for a delay interval associated with the OR gate 23 and flip-flop 24 as indicated in FIG. 3f, the half cycle of the IF signal must be greater than the delay interval to prevent AND gate 26 from being activated by the output from comparator 22 caused by the next negative half wave pulse of the IF signal 30a.

The second trigger pulse 33b sets flip-flop 24 again in preparation for the second IF signal 30b. As a small phase shift is present between the first and second IF signals, the first positive half wave pulse of the latter is smaller in amplitude than the first positive half wave of the former, but still greater than the threshold level 40 so that the comparator 21 produces an output 31b. Similar circuit actions take place to those just described to maintain flip-flop 27 under the reset condition.

In the circuit actions that have taken place in connection with the first and second IF signals, comparator 22 has been triggered by the first negative half wave pulses of the first and second IF signals to thereby produce output pulses 32a and 32b on lead 32, respectively. However, AND gate 26 has been disabled by the outputs 31a and 31b from the comparator 21 before the outputs 32a and 32b from the comparator 22 occur.

The third trigger pulse 33c triggers flip-flop 24 into the set condition again in preparation for the third IF signal 30c. Because of a further phase shift, the third IF signal occurs such that its first positive half wave pulse falls below the threshold level 40 and its first negative half pulse becomes the first that triggers comparator 22 to thereby produce an output 32c which activates the AND gate 26 (FIG. 3g) to trigger flip-flop 27 into the set condition so that its Q output goes high (FIG. 3h). The high level potential at the Q output of flip-flop 27 is fed back to the inverting terminal of comparator 21 and to the noninverting terminal of comparator 22 through feedback resistors R5 and R6, respectively. The threshold level of the comparator 21 is thus raised to a level as indicated at 40' which is slightly below the maximum positive amplitude of the IF signal, while the threshold level of the comparator 22 is shifted to a level 41' which is sufficiently smaller than the maximum amplitude of the negative half wave pulse of the IF signal to make certain that the comparator 22 produce an output in the presence of noise in the IF signal.

Figure 3:
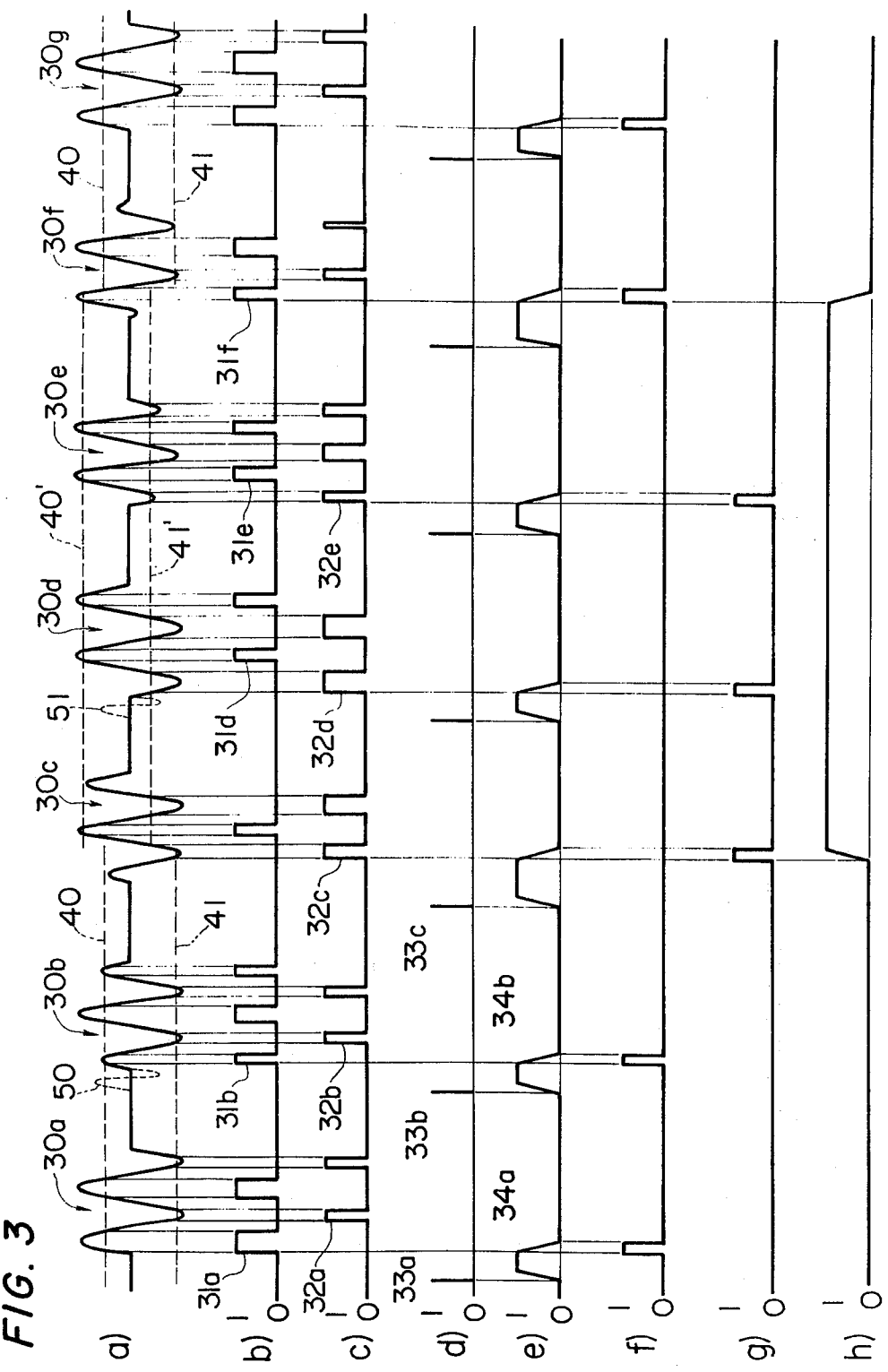
FIG. 3 is a series of waveforms appearing at various points of the circuit of FIG. 2.

As is seen from FIG. 3, the comparator 22 will be the first to be activated by the fourth and fifth IF signals 30d and 30e to produce its outputs 32d and 32e, respectively, followed respectively by the outputs 31d and 31e from the comparator 21. Therefore, AND gate 26 is consecutively activated to maintain flip-flop 27 under the set condition until the occurrence of a sixth IF signal 30f.

With a further phase shift of IF signal, the effective first half wave pulse of the sixth IF signal 30f is positive which upon reaching the threshold level 40' triggers comparator 21 to generate an output 31f which resets flip-flop 27 and restores the reference potentials of both comparators to the initial levels, so that comparator 21 is ensured to generate its output in the presence of noise.

As explained in the foregoing description, one of the reference potentials of the comparators 21 and 22 is set at a level whose absolute value is smaller than the absolute value of the other reference potential. This is effective in avoiding noise components such as shown at 50 and 51 in FIG. 3a, since, although the component 50 may trigger the comparator 21 to produce a false output, this false output only serves to maintain the flip-flop 27 under the reset condition. Likewise, the noise component 51 will trigger comparator 22 to produce a false output, which maintains the flip-flop 27 under the set condition. As a result of asymmetrical values of signal detecting levels relative to the zero voltage level of the incoming signal, there is a wide positive margin for the comparator 21 sufficient to generate signals 31a and 31b during the time interval prior to the shift of reference levels from 40 and 41 to 40' and 41', respectively, while there is a wide negative margin for the comparator to generate signals 32c, 32d and 32e after the peak value of negative half cycle reaches the negative reference level 41. Therefore, there is substantially no likelihood of generating false signals even when the speed of the vehicle relative to the object falls to zero.

The output from the flip-flop 27 appears for each phase shift of 180° and thus represents the speed of the target relative to a given point which may be a vehicle having the radar of the present invention mounted thereon. The speed representative signal from the flip-flop 27 is counted in the utilization circuit to indicate the speed.

What is claimed is:

1. A pulse radar having means for transmitting pulsed high-frequency electromagnetic energy to an object moving relative to a given point and means for receiving a signal returned from the object, means for converting said signal into an intermediate frequency signal which varies in phase with the speed of said object relative to said given point, and a circuit for processing said intermediate frequency signal in order to determine said relative speed, said processing circuit comprising:

- means for generating a first output signal when a positive half wave of said intermediate frequency signal reaches a positive threshold level and generating a second output signal when a negative half wave of said intermediate frequency signal reaches a negative threshold level;
- a bistable device responsive to the first and second output signals to assume first and second binary states, respectively;
- means for permitting passage to said bistable device of the one of said output signals that occurs earlier than the other output signal and preventing passage to said bistable device of the other output signal until the order of occurrence of said output signals is reversed; and
- varying means for said positive and negative threshold levels when said bistable device changes its binary state.

2. A pulse radar as claimed in claim 1, wherein said varying means comprises a first feedback circuit connecting an output from said bistable device representing said first binary state to said signal generating means to vary said positive threshold level and a second feedback circuit connecting an output from said bistable device representing said second binary state to said signal generating means to vary said negative threshold level.

3. A pulse radar as claimed in claim 1, further comprising means for setting the absolute value of said positive threshold level at a value smaller than the absolute value of said negative threshold level when said bistable device is in one of said first and second binary states and means for setting the absolute value of said positive threshold level at a value larger than the absolute value of said negative threshold level when said bistable device is in the other binary state.

4. A pulse radar as claimed in claim 3, wherein said means for generating first and second output signals comprises:

- a first comparator having a first input for receiving said intermediate frequency signal and a second input biased at a first reference potential and an output for generating said first output signal when the potential at the first input reaches the potential at the second input; and
- a second comparator having a first input for receiving said intermediate frequency signal and a second input biased at a second reference potential and an output for generating said second output signal when the potential at the first input reaches the potential at the second input.

5. A pulse radar as claimed in claim 4, wherein the second inputs of said first and second comparators are connected to the output of said bistable device.

6. A pulse radar as claimed in claim 4, wherein said means for permitting and preventing the passage of said output signals to the bistable device comprises:

- a second bistable device responsive to said first and second output signals to assume a first binary state and responsive to the transmission of each of said pulsed high-frequency electromagnetic energy to assume a second binary state;
- a first gate for passing said first output signal to the first bistable device in response to the output from the second bistable device; and
- a second gate for passing said second output signal to the first bistable device in response to the output from the second bistable device.

7. A pulse radar as claimed in claim 6, wherein said means for permitting and preventing the passage of said output signals further comprises an OR gate through which said second bistable device is responsive to said first and second output signals.

* * * * *